(12) United States Patent
Kim (10) Patent No.: US 9,197,954 B2
(45) Date of Patent: Nov. 24, 2015

(54) WEARABLE COMPUTER

(71) Applicant: Hyundai Motor Company, Seoul (KR)

(72) Inventor: Sung Un Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 14/142,859

(22) Filed: Dec. 29, 2013

(65) Prior Publication Data

US 2015/0104038 A1    Apr. 16, 2015

(30) Foreign Application Priority Data

Oct. 14, 2013    (KR) .......................... 10-2013-0122235

(51) Int. Cl.
| | |
|---|---|
| *H04R 1/08* | (2006.01) |
| *G06F 1/16* | (2006.01) |
| *H04R 1/02* | (2006.01) |
| *G01S 3/801* | (2006.01) |
| *G02B 27/00* | (2006.01) |
| *G06F 3/048* | (2013.01) |
| *G01S 5/30* | (2006.01) |

(52) U.S. Cl.
CPC . *H04R 1/08* (2013.01); *G01S 3/801* (2013.01); *G01S 5/30* (2013.01); *G02B 27/00* (2013.01); *G06F 1/163* (2013.01); *G06F 3/048* (2013.01); *H04R 1/028* (2013.01); *H04R 2499/13* (2013.01); *H04R 2499/15* (2013.01)

(58) Field of Classification Search
None
See application file for complete search history.

(56) References Cited

U.S. PATENT DOCUMENTS

| 6,064,335 A | * | 5/2000 | Eschenbach | ........... B64D 43/00 340/961 |
| 7,791,809 B2 | | 9/2010 | Filipovich et al. | |
| 2011/0140994 A1 | * | 6/2011 | Noma | .................. G02B 27/017 345/8 |
| 2012/0087212 A1 | * | 4/2012 | Vartanian | ................ G01S 15/08 367/118 |
| 2014/0079242 A1 | * | 3/2014 | Nguyen | .................... H04R 5/00 381/86 |

FOREIGN PATENT DOCUMENTS

| KR | 10-2004-0097477 | 11/2004 |
| KR | 10-2009-0000186 | 1/2009 |

* cited by examiner

*Primary Examiner* — Wayne Young
*Assistant Examiner* — Mark Fischer
(74) *Attorney, Agent, or Firm* — Mintz Levin Cohn Ferris Glovsky and Popeo, P.C.; Peter F. Corless (57) ABSTRACT

A wearable computer is provided. In particular, a communication unit transmits/receives information associated with a vehicle from/to an external control apparatus. A microphone collects sound waves generated from a sound source in the vehicle, and a posture detecting sensor detects a posture of a wearer. A controller then generates augmented reality information by processing internal and/or external information received from the external control apparatus, calculates a location of wearer using sound waves collected from the microphone, and generates augmented reality information according to an alignment of a window of vehicle or devices in the vehicle using the location and the posture of the wearer displays the augmented reality information generated at the controller.

10 Claims, 10 Drawing Sheets

WEARABLE COMPUTER

CROSS-REFERENCE TO RELATED APPLICATION

This application claims priority to and the benefit of Korean Patent Application No. 10-2013-0122235 filed in the Korean Intellectual Property Office on Oct. 14, 2013, the entire contents of which are incorporated herein by reference.

BACKGROUND OF THE INVENTION (a) Field of the Invention

The present invention relates to a wearable computer. More particularly, the present invention relates to a wearable computer that measures a location and posture of wearer in vehicle, provides augmented reality information, and sets/adjusts various environments within a vehicle according to the location of the wearer.

(b) Description of the Related Art

Generally, head up display (HUD) collects peripheral image data of a vehicle, and displays/projects information onto a surface of the vehicle in front of the driver, typically the windshield.

However, in order to effectuate this system, additional optical devices are needed in the dash of the vehicle in order to display the information on the windshield of vehicle. Generally, because these optical devices are so large, these optical devices occupy a large amount of space when these optical devices are configured in the vehicle. Thus, it restricts the size and the components that can be utilized in vehicle.

Also, in order to display augmented reality information according to a driver's observing direction, separate optical devices must be installed in each window of the vehicle. This is not economical or cost efficient.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wearable computer for displaying augmented reality information according to a location and posture of a driver wearing wearable computer. In addition, present invention has been made in an effort to provide a wearable computer for adjusting a conditioner or audio device according to a location of a driver.

A wearable computer according to an exemplary embodiment of the present invention includes, a communication unit configured to transmit/receive information related to vehicle from/to an external control apparatus, a microphone configured to collect sound waves generated from a sound source in the vehicle, a posture detecting sensor that detects a posture of a wearer, a controller configured to generate a augmented reality information by processing internal and/or external information received from the external control apparatus, calculate a location of wearer using sound wave collected from the microphone, and generate an augmented reality information according to an alignment of a window of vehicle or devices in the vehicle using the location and the posture of the wearer; and a display unit for displaying the augmented reality information generated at the controller.

The controller may, for example, measure the location of the wearer by synchronizing the sound waves generated at the sound sources through communication with the communication unit. The external control apparatus may modulate the sound wave of non-audible frequency and transmit modulated sound wave, and the controller measures the location of the wearer using the modulated sound wave.

The posture detecting sensor may be embodied as any one of an acceleration sensor, gyro sensor or earth magnetic field sensor, or combination thereof.

The external control apparatus sets/adjusts an environment of the vehicle using the location of the wearer measured at the controller according to the location of the wearer. The location of the wearer may be more specifically, calculated using a triangulation method through at least three sound wave collected from the microphone.

BRIEF DESCRIPTION OF THE DRAWINGS

The drawings are provided for reference in describing exemplary embodiments of the present invention and the spirit of the present invention should not be construed only by the accompanying drawings.

DESCRIPTION OF SYMBOLS

20: microphone
30: posture detecting sensor
40: controller
50: communication unit
60: display unit
200: external control apparatus

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe the present invention, portions that are not connected with the description will be omitted. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller, computer, control unit or the like. The terms controller, computer, control unit or the like refer to a hardware device that includes a memory and a processor configured to execute one or more steps/processes that should be interpreted as its algorithmic structure. The memory is configured to store algorithmic steps and the processor is specifically configured to execute said algorithmic steps to perform one or more processes which are described further below. Additionally, although the exemplary embodiments may be described as being performed a plurality of processors, control units, etc., it should be understood that such a method can also be performed by a single controller configuration without departing from the overall embodiment.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
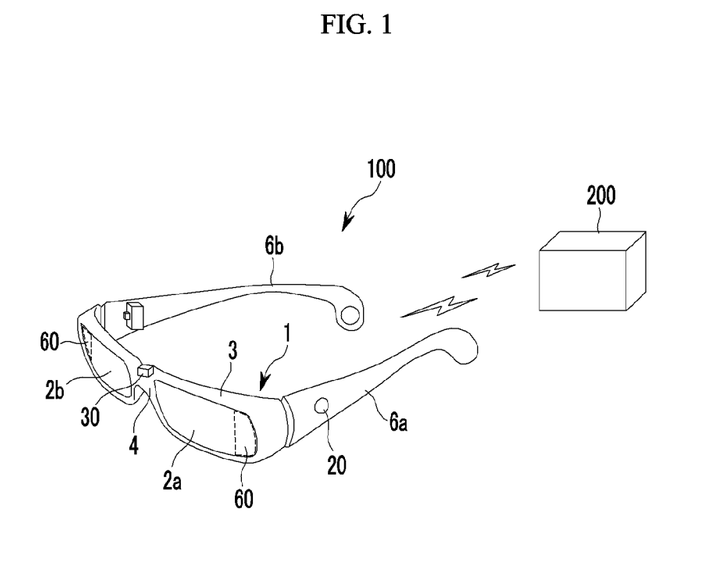
FIG. 1 shows perspective view of a wearable computer according to an exemplary embodiment of the present invention.

FIG. 1 shows perspective view of a wearable computer according to an exemplary embodiment of the present invention. And FIG. 2 shows a block diagram of a wearable computer according to an exemplary embodiment of the present invention.

As shown in FIG. 1, a wearable computer according to an exemplary embodiment of the present invention includes a main body 1, an external control apparatus 200 that communicates with the main body 1 and is provided in a vehicle. The main body 1 includes a left lens 2a and a right lens 2b, a pair of frames of glasses 3 coupled with the left lens 2a and the right lens 2b, a bridge 4 connecting a pair of the frames of glasses 3, and a pair of arms provided at the frame of glasses 3.

Figure 2:
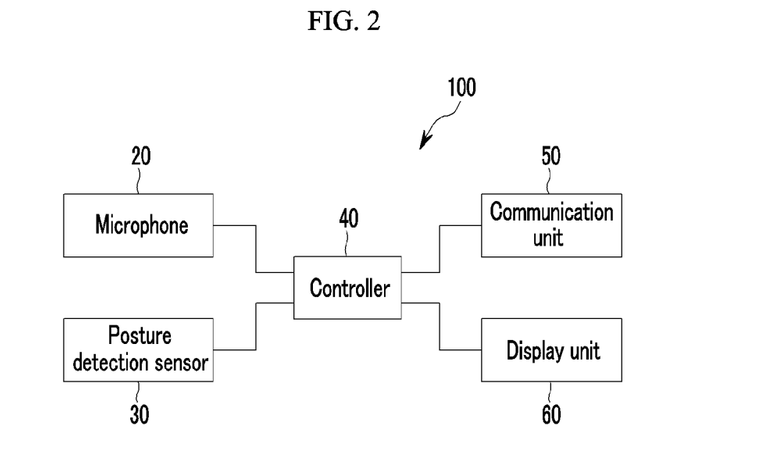
FIG. 2 shows a block diagram of a wearable computer according to an exemplary embodiment of the present invention.

As shown in FIG. 2, the wearable computer according to an exemplary embodiment of the present invention includes a communication unit 50 (such as a transceiver) that transmits and receives information related to a vehicle from/to an external control apparatus 200, a microphone 20 configured to collect sound waves generated from a sound source in the vehicle, a posture detecting sensor 30 configured to detect a posture of a wearer, a controller 40 configured to process data transferred from the microphone 20 and the posture detecting sensor 30, and a display unit 60 that displays the information processed by the controller 40.

The microphone 20 provided in the vehicle collects a sound wave generated at a sound source such as a speaker and transfers the sound wave to the controller 40. The controller 40 calculates a location of the wearable computer in the vehicle using the sound wave transferred from the microphone 20.

Additionally, the posture detecting sensor 30 detects a posture of the wearable computer and may be embodied as any one of an acceleration sensor, gyro sensor or earth magnetic field sensor, or combination thereof. The posture of the wearable computer such as an angle of the wearer or observation direction of the wearer can be detected using the posture detecting sensor 30. This posture information detected at the posture detecting sensor 30 is transferred to the controller 40.

The controller 40 may process internal or external information transferred from the external control apparatus 200 and generate augmented reality information. That is, the controller 40 receives obstacle information outside of the vehicle, image information outside of the vehicle, and driving information associated with the vehicle from the external control apparatus 200, processes this information, and generates augmented reality information such as icons, text, figures, and images. The generated augmented reality information by the controller 40 is then transferred to the display unit 60.

The display unit 60 may be provided on each of the left lens 2a and the right lens 2b. The display unit 60 may be formed as a see-through lens display formed on a part or entire of the left lens 2a or the right lens 2b.

When the see-through lens display is not operated, the wearer can see an image outside of a lens through the lens. When the see-through lens display is operated, the image outside of the lens is blocked entirely, or a part of which on augmented reality information is displayed is blocked and the rest of the lens on which augmented reality information is not displayed is transparent. Therefore, the image outside of the lens and augmented reality information can be seen simultaneously through the see-through lens display in this embodiment.

Hereinafter, a method which measures a location of the wearer wearing the wearable computer according to an exemplary embodiment of the present invention will be described.

Figure 3:
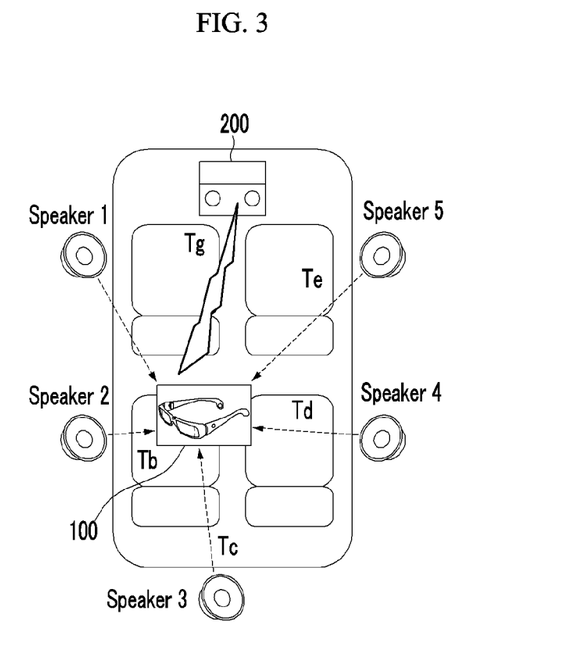
FIG. 3 schematically shows a method for measuring a location of a wearer in a vehicle using a wearable computer according to an exemplary embodiment of the present invention.

FIG. 3 schematically shows a method for measuring a location of a wearer in a vehicle using a wearable computer according to an exemplary embodiment of the present invention. As shown in FIG. 3, the controller 40 calculates a location of the wearer in the vehicle using a sound wave collected from the microphone 20. At this time, the location of the wearer is calculated by, e.g., triangulation. In order to calculate the location of the wearer using triangulation, the controller uses the arrival time of the sound wave transferred from at least three speakers.

Figure 4A:
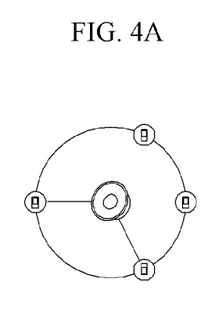
FIGS. 4A-C schematically show a method for measuring a location of a wearer using triangulation.

FIG. 4 schematically shows a method for measuring a location of a wearer using triangulation. First, as shown in FIG. 4A, the arrival time that the sound wave generated from one speaker in the vehicle arriving the wearable computer is measured and measured arrival time is converted to distance. At this point, the wearer located at same distance as the wearable computer from the speaker exists on a sphere formed with the speaker as the center.

Figure 4B:
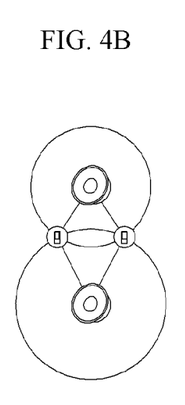

As shown in FIG. 4B, the arrival times of the sound waves generated from two speakers in the vehicle arriving at the wearable computer are measured and the measured arrival times are converted into two distances. Then, two spheres are formed with the two speakers as the center. At this point, the wearer exists on a surface overlapped by the two spheres.

Figure 4C:
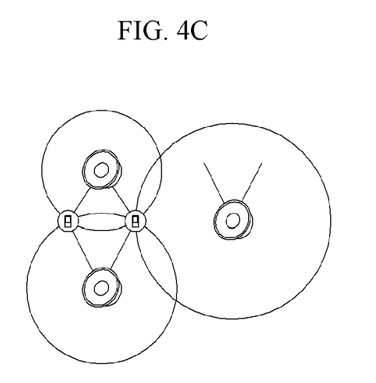

Next as shown in FIG. 4C, the arrival times of the sound waves generated from three speakers in the vehicle arriving at the wearable computer are measured and the measured arrival times are converted to three distances. Then, three spheres are formed with the three speakers as the center. At this point, the wearer exists on a point overlapped by the three spheres. As such, when arrival times are measured using the sound waves generated from three speakers and the measured arrival times are converted to distances, the location of wearer can be calculated to a certain degree of accuracy.

Generally, at least four speakers are provided in the vehicle. Therefore, the location of the wearer measured by three speakers is corrected using sound wave transferred from at least four speakers and as such a more accurate location of the wearer can be calculated. Also, multi-path errors may occur due to an object such as a chair while the sound waves are being transferred from the speaker. These multi-path errors can be minimized when the location of the wearer is measured using at least four speakers as well.

Figure 5:
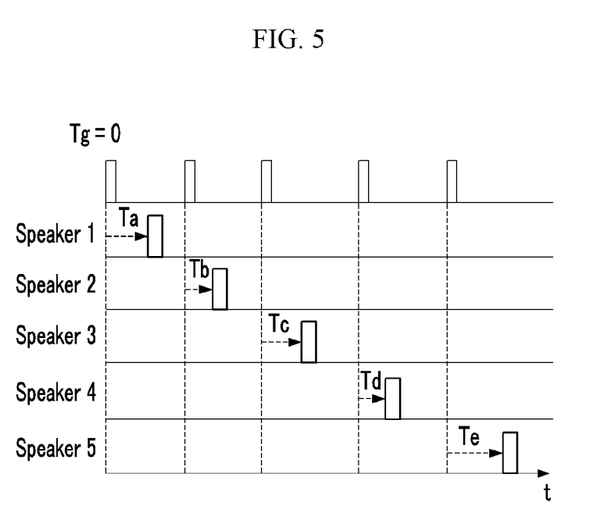
FIG. 5 schematically shows a transferring process of a sound wave generated from a plurality of speaker according to an exemplary embodiment of the present invention.

Each speaker and the wearable computer should be synchronized when the location of the wearer is calculated using above method. Thus, the communication unit 50 provided at the wearable computer is preferably able to communicate with the external control apparatus 200 in the vehicle. For example, the wearable computer and the external control apparatus 200 in the vehicle may be communicate with each other using Bluetooth or Wi-Fi. As shown in FIG. 5, an arrival time from synchronization time to the microphone is measured and the arrival time converted to distance. The location of the wearer is then calculated using the converted distance.

Figure 6A:
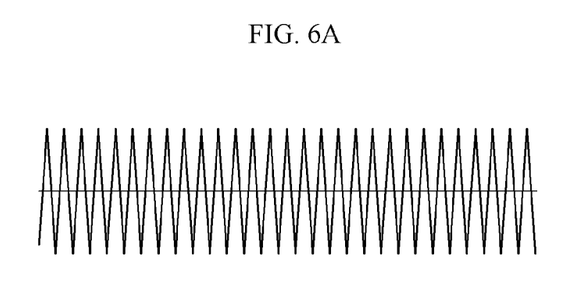
FIGS. 6A-C schematically show a modulating process of a sound wave generated from a speaker according to an exemplary embodiment of the present invention.
Figure 6B:
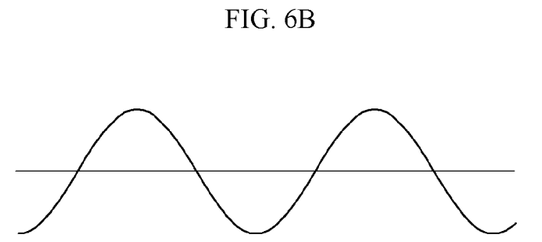
Figure 6C:
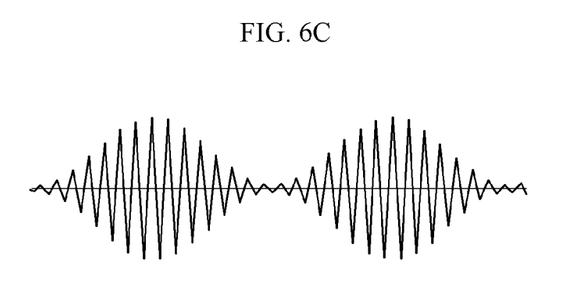

FIG. 6 schematically shows a modulating process of a sound wave generated from a speaker according to an exemplary embodiment of the present invention. As shown in FIG. 6, the external control apparatus 200 modulate the sound wave generated at the speaker and transmits the modulated sound wave, thereby it can be remove noise generated at the speaker. Thus, the carrier of sound wave signal and modulating wave are composed and modulated wave is then transmitted.

At this time, it is preferable that a modulating frequency outside of an audible frequency band (e.g., about 10-10 kHz) is used. Therefore, passengers in the vehicle do not hear a noise because the location identification sound waves are in a non-audible frequency band.

As described, the controller 40 can determine alignment of the wearer and devices in the vehicle such as, a window, cluster or center fascia using the location and the posture of the wearer. That is, the controller 40 can determine the location of the wearer wearing the wearable computer in the vehicle is located, observation direction of the wearer, and inclination angle of the wearer.

Therefore, it is possible that augmented reality information can be displayed, when the wearer looks through a front window. For example, augmented reality information can be displayed in the display unit 60 when the wearer looks through front window. In contrast, the augmented reality information may not be displayed in the display unit 60 when the wearer looks through the side window or rear window.

Additionally, in some exemplary embodiments of the present invention, when the wearer looks at a device/control in the vehicle, the controller 40 may perceive this information associated with the device through the communication unit 50 and this information is then transmitted to the display unit 60, thereby received information is displayed in the display unit 60. For example, a method of manipulating audio device is received from the external control apparatus 200 and is displayed in the display unit 60. Or, when the device is out of order, a method of repairing the device is received from the external control apparatus 200 and is displayed in the display unit 60.

Furthermore, the controller 40 may transmit the location of the wearer to the external control apparatus 200 in the vehicle. The external control apparatus 200 may also adjust and set devices in the vehicle according to location of the wearer.

For example, when the wearer is listening to music in the vehicle, a volume is adjusted or an equalizer is adjusted according to location of the wearer. That is, when the wearer sits in a driver's seat, the external control apparatus 200 controls the audio device so as to sound of speaker is distributed around the driver's seat. When the wearer sits in a passenger's seat, the external control apparatus 200 controls the audio device so as to sound of speaker is distributed around the passenger's seat.

When the location of the wearer is transmitted to the external control apparatus 200, the external control apparatus 200 may for example control air conditioner according to the location of the wearer. That is, temperature or air strength in the vehicle is controlled according to the location of the wearer.

In another exemplary embodiment, the location of the wearer is transmitted to the external control apparatus 200, a seat in the vehicle may be set according to the location of the wearer. That is, the distance away from the dash or a posture of the seat may be controlled according to the location of the wearer.

When body state information such as the location of the wearer and weight of the wearer and a height of the wearer are transmitted to the external control apparatus 200, this information may also be used to control airbag deployment according to the body state information.

Also, if the vehicle supports mirror link technology, a differentiated contents are provided according to the location of the wearer. For example, when the wearer sits driver's seat, a navigation program can be performed by mirror link. When the wearer sits passenger's seat, an audio program can be performed by mirror link.

According to the wearable computer of an exemplary embodiment of the present invention, a location and posture of the wearer can be determined using the sound waves generated by a plurality of sound sources in the vehicle, and augmented reality information can be provided according to the location and posture of the wearer in the vehicle. And since the location of the wearer is calculated using non-audible frequency band, the noise that a passenger can perceive is minimized. Devices in the vehicle including an air conditioner or an audio device can also be set according to the location of the wearer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wearable computer comprising:
   a communication unit configured to transmit and receive information associated with a vehicle to and from an external control apparatus;
   a microphone configured to collect sound waves generated from at least one sound source in the vehicle;
   a posture detecting sensor configured to detect a posture of a wearer;
   a controller configured to generate augmented reality information by processing information received from the external control apparatus, to calculate a location of the wearer using sound waves collected by the microphone, and to generate augmented reality information according to an alignment of a window of the vehicle or devices in the vehicle using the location and the posture of the wearer; and
   a display unit that displays the augmented reality information generated at the controller
   wherein the external control apparatus modulates the sound waves at a non-audible frequency and transmits the modulated sound waves, and the controller measures the location of the wearer using the modulated sound waves.

2. The wearable computer of claim 1,
   wherein the controller measures the location of the wearer by synchronizing the sound waves generated at the sound sources through communication with the communication unit.

3. The wearable computer of claim 1,
   wherein the posture detecting sensor is selected from a group consisting of an acceleration sensor, gyro sensor, earth magnetic field sensor and combination thereof.

4. The wearable computer of claim 1,
   wherein the external control apparatus adjusts an environment of the vehicle using the location of the wearer measured at the controller according to the location of the wearer.

5. The wearable computer of claim 1,
   wherein the location of the wearer is calculated using a triangulation method through at least three sound waves from three different sound sources in the vehicle.

6. A method comprising:
   transmitting and receiving, by a communication unit, information associated with a vehicle to and from an external control apparatus;
   collecting, by a microphone, sound waves generated from at least one sound source in the vehicle;
   detecting, by a sensor, a posture of a wearer;
   generating, by a controller, augmented reality information by processing information received from the external control apparatus,
   calculating, by the controller, a location of the wearer using sound waves collected by the microphone;
   generating, by the controller, augmented reality information according to an alignment of a window of the vehicle or devices in the vehicle using the location and the posture of the wearer; and
   displaying, by a display unit, the augmented reality information generated at the controller
   wherein the external control apparatus modulates the sound waves at a non-audible frequency and transmits the modulated sound waves, and the method further comprises measuring the location of the wearer using the modulated sound waves.

7. The method of claim 6, further comprising measuring, by the controller, the location of the wearer by synchronizing the sound waves generated at the sound sources through communication with the communication unit.

8. The method of claim 6, further comprising adjusting an environment of the vehicle using the location of the wearer measured at the controller according to the location of the wearer.

9. The method of claim 6,
   wherein the location of the wearer is calculated using a triangulation method through at least three sound waves from three different sound sources in the vehicle.

10. A non-transitory computer readable medium containing program instructions executed by a processor or controller, the program instructions comprising:
    program instructions that generate augmented reality information by processing information received from an external control apparatus,
    program instructions that calculate a location of the wearer using sound waves collected by a microphone;
    program instructions that generate augmented reality information according to an alignment of a window of a vehicle or devices in the vehicle using the location and posture of the wearer detected by a sensor; and
    program instructions that display the augmented reality information generated at the processor or the controller
    wherein the external control apparatus modulates the sound waves at a non-audible frequency and transmits the modulated sound waves, and the program instructions further comprise program instructions that measure the location of the wearer using the modulated sound waves.

* * * * *